US008615567B2

(12) United States Patent
Behera et al.

(10) Patent No.: US 8,615,567 B2
(45) Date of Patent: Dec. 24, 2013

(54) SYSTEMS AND METHODS FOR SERVICES EXCHANGE

(75) Inventors: Aasish Behera, Tarrytown, NY (US); Kamal Bhattacharya, Pleasantville, NY (US); Mitchell A. Cohen, Yorktown Heights, NY (US); Nirmit Desai, Raleigh, NC (US); Pietro Mazzoleni, Lecco (IT); Jakka Sairamesh, New York, NY (US); Stefan Tai, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1824 days.

(21) Appl. No.: 11/677,043

(22) Filed: Feb. 20, 2007

(65) Prior Publication Data

US 2008/0201408 A1 Aug. 21, 2008

(51) Int. Cl.

*G06F 15/16* (2006.01)
*G06F 7/04* (2006.01)
*G06Q 10/00* (2012.01)

(52) U.S. Cl.

USPC ................................ 709/219; 705/1.1; 726/3

(58) Field of Classification Search

USPC ................................ 709/219; 705/1.1; 726/3
See application file for complete search history.

(56) References Cited

U.S. PATENT DOCUMENTS 5,949,876 A * 9/1999 Ginter et al. .................... 705/80
7,647,627 B2 * 1/2010 Maida-Smith et al. ......... 726/12
2002/0049603 A1 * 4/2002 Mehra et al. ...................... 705/1
2008/0072290 A1 * 3/2008 Metzer et al. ..................... 726/3
2008/0114668 A1 * 5/2008 Peters et al. .................... 705/32

* cited by examiner

*Primary Examiner* — Ranodhi Serrao
(74) *Attorney, Agent, or Firm* — Ido Tuchman; William Stock

(57) ABSTRACT

A services computing system may include a server and a plurality of clients in communication with the server. The system may further include a plurality of service exchange units in communication with the server with each of the plurality of service exchange units providing a service to a portion of the plurality of clients based upon permissions and data received from the portion of the plurality of clients. A system contemplated herein helps to better manage complex business ecosystems with heterogeneous and/or homogenous groups of clients.

18 Claims, 2 Drawing Sheets

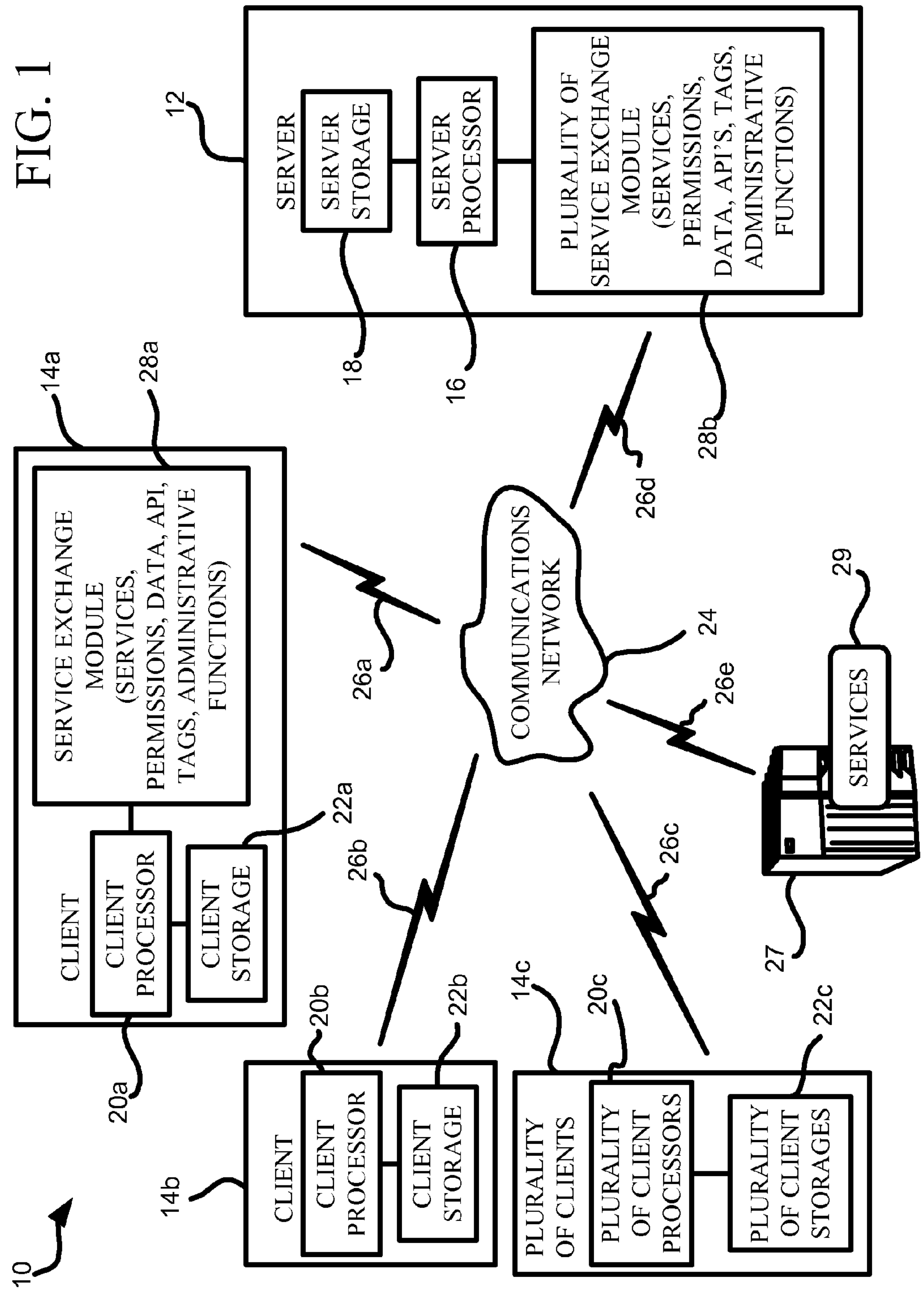
FIG. 1
10
SERVER
12
SERVER STORAGE
18
SERVER PROCESSOR
16
PLURALITY OF SERVICE EXCHANGE MODULE (SERVICES, PERMISSIONS, DATA, API'S, TAGS, ADMINISTRATIVE FUNCTIONS)
28b
CLIENT
14a
SERVICE EXCHANGE MODULE (SERVICES, PERMISSIONS, DATA, API, TAGS, ADMINISTRATIVE FUNCTIONS)
28a
CLIENT PROCESSOR
20a
CLIENT STORAGE
22a
COMMUNICATIONS NETWORK
24
26a
26b
26c
26d
26e
SERVICES
29
27
CLIENT
14b
CLIENT PROCESSOR
20b
CLIENT STORAGE
22b
PLURALITY OF CLIENTS
14c
PLURALITY OF CLIENT PROCESSORS
20c
PLURALITY OF CLIENT STORAGES
22c

SYSTEMS AND METHODS FOR SERVICES EXCHANGE

FIELD OF THE INVENTION

The invention relates to the field of services science, and, more particularly, to services computing and related methods.

BACKGROUND OF THE INVENTION

There are a number of trends associated with the growth and use of the Internet. Services computing, most prominently enabled by the Web services platform is one such trend. For example, Service-oriented architectures (SOA) are increasingly being used to provide and use software as interoperable (Web) services over the Internet. However, a Web services-based SOA is a specific system, whose structures are based on interactions among individual (Web) services and their clients. Services computing to-date does not provide a grouping concept for heterogeneous services to build SOA based on units that are on a higher-level of abstraction than individual services.

Another major trend is related to the way that people use the Internet. Social communities and community platforms such as MySpace.com, Flickr.com, and YouTube.com attract very large numbers of individuals to share arbitrary content. From a technical viewpoint, community platforms are Web portals that provide basic functionality for the dissemination and aggregation of data in large-scale networks. Community practices center on the use of Web 2.0 technology that enables simple, more ad-hoc composition and content mash-ups, and documentation and content selection through less formal techniques such as social tagging and rating. In other words, such community platforms are highly flexible systems exploiting the power of people networks, but are usually limited to the dissemination and aggregation of data, but do not integrate (Web) services.

Communities can be used to disseminate and aggregate (heterogeneous) services; in doing so, groups of (heterogeneous) service are created. Unfortunately, this combination of Web services computing and community platforms has not been provided to-date.

SUMMARY OF THE INVENTION

In view of the foregoing background, it is therefore an object of the invention to provide a Web services platform that is flexible and which enables the dissemination and aggregation of services through (heterogeneous) services groups.

This and other objects, features, and advantages in accordance with the invention are provided by a service computing system that may include a server and a plurality of clients in communication with the server.

The system may further include a plurality of service exchange units in communication with the server with each of the plurality of service exchange units providing at least one service to a portion of the plurality of clients based upon permissions and data received from the portion of the plurality of clients. In other words, each of the plurality of clients is a member of at least one service exchange unit. Accordingly, a more flexible Web services platform that enables more than the dissemination and aggregation of data is provided, and one that allows to create multiple groups of one or more services and the clients that use them.

Each of the plurality of service exchange units may maintain the availability of each service in confidence. Each of the plurality of service exchange units may have the permissions defined by at least one of the clients. Each of the plurality of service exchange units may also be created by at least one of the clients.

At least one of the services provided by the service exchange units may perform upon being invoked. Each of the service exchange units may communicate with the clients using an application programming interface. Each of the service exchange units may use tags defined by the clients. In addition, the service exchange units may matchmake between the clients based upon the tags. Matchmaking may include the action of matching two clients together based on one client's confidential needs and requirements and the other client's confidential service offerings.

Each of the plurality of service exchange units may provide administrative control over at least one of the service, access to the service, use of the service, and billing related to the service. At least one of the clients may host one of the service exchange units.

Another aspect of the invention is a method for services computing. The method may include providing a server in communication with the clients and the service exchange units. The method may further include providing at least one service via each of the service exchange units to a portion of the clients based upon permissions and data received from the portion of the clients.

BRIEF DESCRIPTION OF THE DRAWINGS

FIG. 1 is a schematic block diagram of the service computing system in accordance with the invention.

DETAILED DESCRIPTION OF THE PREFERRED EMBODIMENTS

Figure 2:
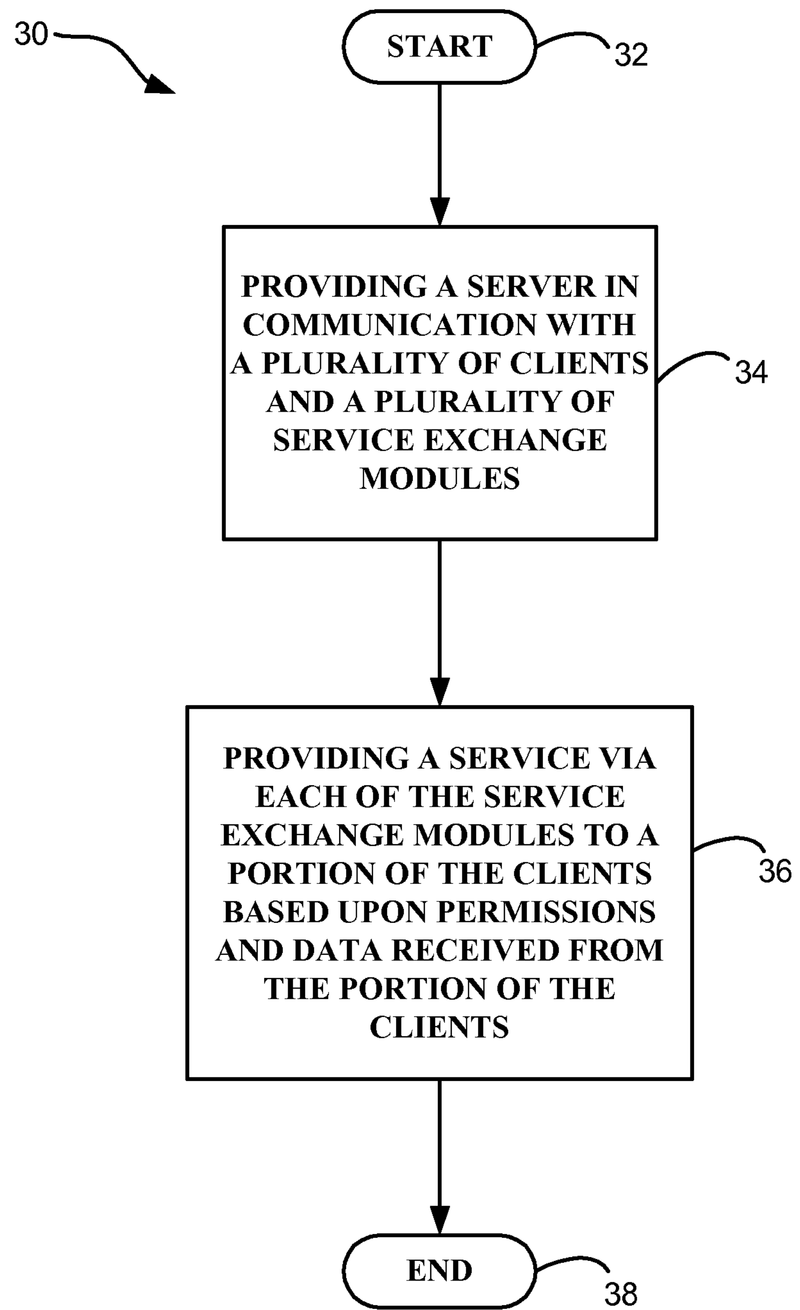
FIG. 2 is a flowchart illustrating method aspects according to the invention.

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one skilled in the art, the present invention may be embodied as a method, system, or computer program product. Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring initially to FIG. 1, a system 10 for service computing is initially described. The system 10 includes a server 12 and a plurality of clients 14*a*-14*c* in communication with the server.

The server 12 includes a server processor 16 or other logic circuitry which is connected to server storage 18 as will be appreciated by those of skill in the art. In other embodiments, the server storage 18 may be embedded in the server processor 16.

Each of the plurality of clients 14*a*-14*c* includes a respective client processor 20*a*-20*c* or other logic circuitry which is connected to a respective client storage 22*a*-22*c* as will be appreciated by those of skill in the art. In other embodiments, each client storage 22*a*-22*c* may be embedded in a respective client processor 20*a*-20*c*.

The server 12 communicates with the plurality of clients 14*a*-14*c* through a communication network 24 via communication links 26*a*-26*e* as will be appreciated by those of skill in the art. The communication network 24 is a wireless network and/or a wired network.

The system 10 further includes a plurality of service exchange units 28*a* and 28*b* in communication with the server 12, for example. In one embodiment, each of the plurality of service exchange units 28*a* and 28*b* provide at least one service to a portion of the plurality of clients 14*a*-14*c* based upon permissions and data received from the portion of the plurality of clients. The service may invoke system software, application software or the like to enable functionality based on the data that is more than the dissemination and aggregation of data.

In one embodiment, each of the plurality of service exchange units 28*a* and 28*b* maintains the availability of its respective service(s) in confidence. In other words, each of the plurality of clients 14*a*-14*c* is unaware of the services offered by any of the service exchange units 28*a* and 28*b*, unless a particular client has received and invoked a permission granted by one of the service exchange units. A permission grants particular rights within a service exchange unit 28*a* and 28*b* to the particular client 14*a*-14*c* who is a member. It is contemplated that a member is an individual or group that has been assigned access rights to interact with a service community by providing and/or using one or more services offered by a service exchange unit.

In another embodiment, each of the plurality of service exchange units 28*a* and 28*b* is created by at least one of the clients 14*a*-14*c*. Stated another way, one of the clients 14*a*-14*c* acts as the administrator for the service exchange units 28*a* and 28*b* and selects such things as which services will be available on the service exchange unit. Further, each of the plurality of service exchange units 28*a* and 28*b* have the permissions defined by a clients 14*a*-14*c* with administrative duties thereby permitting such client the power to control access to the service exchange unit.

In another embodiment, each of the service exchange units 28*a* and 28*b* provides administrative control over at least one of the service, access to the service, use of the service, and billing related to the service(s). For instance, the clients 14*a*-14*c* may exchange and/or use service(s) on the service exchange units 28*a* and 28*b* with minimal administrative oversight because the system 10 provides such.

In one embodiment, the service exchange units 28*a* and 28*b* are hosted by at least one of the clients 14*a*-14*c* and the server 12. In another embodiment, the service exchange units 28*a* and 28*b* are hosted by the server 12. In yet another embodiment, the service exchange units 28*a* and 28*b* are hosted by at least one of the clients 14*a*-14*c*.

At least one of the services provided by the service exchange units 28*a* and 28*b* perform upon being invoked, for example. In other words, the service(s) to be invoked are already deployed and running. In another embodiment, the service(s) is not just a directory or registry but an executable software program.

In one embodiment, each of the clients 14*a*-14*c* communicate with the service exchange units 28*a* and 28*b* using an application programming interface (API). In another embodiment, each of the service exchange units 28*a* and 28*b* uses tags defined by the clients 14*a*-14*c*. The tags are terms such as keywords associated with a data set and/or a particular function, for instance. Such an association facilitates keyword searching between the term and the data set and/or particular function.

In another embodiment, each of the service exchange units 28*a* and 28*b* matchmakes between the clients 14*a*-14*c* and at least one of the services based upon the tags. Stated another way, each of the service exchange units 28*a* and 28*b* determines the need(s) of the clients 14*a*-14*c* and identifies resources available among the service exchange units that may meet such need(s).

One embodiment includes a service provider 27 coupled to the service exchange units 28*a* and 28*b*. The service provide 27 acts as a client to the service exchange units. Furthermore, the service provider 27 supplies one or more distributed services 29 to member clients. For example, client 20*a* may use the contributed service 29 running on service provider 27 through service exchange unit 28*a*. It is contemplated that many service providers may be coupled to the computing environment of the present invention, offering various web services to the client community.

Another aspect of the invention is directed to a method for services computing, which is now described with reference to flowchart 30 of FIG. 2. The method begins at Block 32 and may include providing a server 12 in communication with clients 14*a*-14*c* and service exchange units 28*a* and 28*b* at Block 34. The method may further include providing a service via each of the service exchange units 28*a* and 28*b* to a portion of the clients 14*a*-14*c* based upon permissions and data received from the portion of the clients at Block 36. The method ends at Block 38.

The system 10 is motivated by the desire to better manage complex business ecosystems that comprise varying groups of clients 14*a*-14*c* (parties). As an example, consider the following scenario from the healthcare industry.

The process of drug discovery requires careful planning and execution of pre-clinical trials to determine the safety and effectiveness of a new drug. Pre-clinical trials involve diverse activities and experiments, which vary depending on the drug to be tested and the parties involved.

When a pharmaceutical company decides to begin a new preclinical trial, its R&D department first needs to identify the parties that will produce the drug (starting from a chemical compound) and the parties that will execute the experiments (according to a specific protocol). The parties can be internal or external. Additional parties may get involved to analyze data produced by the experiments. In the case that external parties are involved, such as hospitals, universities, or CRM (Clinical Research Management) companies, the R&D department has to choose the partners with which to do business and negotiate and agree on economical, legal, and scientific details. During the trial, all parties need to work closely with each other, exchanging information to monitor the process and possibly also modify the protocol. Complex algorithms need to be executed as well as dedicated data sources need to be accessed for analysis and integration of the data coming from the trial.

The complexity of the process is due to variations in the composition of the different (potentially autonomous) parties, variations in regulations of the target market(s) of the drug, and variations in the tasks and type of experiments to perform.

A scenario like the one presented, different groups of parties collaborate by communicating and exchanging information with each other, and by implementing processes that are tailored to the needs of a specific trial. The groups of parties can be considered service communities (of varying scale), where members of the community such as service exchange units 28*a* and 28*b* interact with each other by providing and using services.

Currently, there is little or no Internet-based system support for creating and maintaining such custom, per-project service communities such as service exchange units 28*a* and 28*b*. Existing approaches either address a specific technical concern only (such as selecting a service from a group of available services that offer the same functionality), or focus on community platforms that have little relationship to services computing and service-oriented architecture (SOA).

However, we can observe a number of service marketplaces emerging, including Salesforce.com, Reardencomrnerce.com, Strikelron.com, and Jamcracker.com, which offer e-commerce capabilities to buy and sell services. Service marketplaces and platforms, however, are only a starting point to create and manage the domain-specific, per-project communities such as service exchange units 28*a* and 28*b* discussed in the healthcare scenario above.

General marketplaces may be (too) large in scale (in terms of members and services exchanged), and additional structuring mechanisms beyond simple service registries are required. For example, a runtime services grouping abstraction to loosely compose services of interest to select members is currently missing yet very desirable to have in support of the above healthcare scenario.

As a result, system 10 provides service exchange units 28*a* and 28*b* to create and manage per-project communities such as service exchange units 28*a* and 28*b* within larger-scale service communities and marketplaces. System 10 is a dynamic group of services, where only clients 14*a*-14*c* can contribute services for use by other clients, for instance. Additionally, any kind of service can be contributed to system 10 and membership criteria can be defined by at least one of the clients 14*a*-14*c*.

Membership criteria can include the requirement for each client 14*a*-14*c* to implement one or more system-specific service interfaces.

In one embodiment, the use of the interface and membership criteria can be used to aid in load balancing and fault tolerance. This allows "traditional" distributed computing techniques to be offered by the system 10, such as load balancing of services that implement the same interface or fault-management through group communication protocols.

The main aspect of system 10, however, is to establish a dynamic community platform such as service exchange units 28*a* and 28*b* where services of interest to a community are grouped. Service exchange units 28*a* and 28*b* are created to provide member-directed business and technical value-add. System 10 provides the mechanism for the clients 14*a*-14*c* to contribute various functional and extra-functional services. System 10 builds on research and work on adaptive and extensible middleware, elevating these concepts to the services marketplace layer. Correspondingly, system 10 services that are contributed can include services that intercept the invocation of other contributed services.

While each service exchange unit 28*a* and 28*b* describes a services composition itself—system 10 is a group of diverse services that are contributed by clients 14*a*-14*c*—additional data management functions and choreography functions for services composition (such as sequencing of invocations) can be provided through the system 10.

System 10 also integrates selected community practices of Web 2.0, including community-based tagging to provide meta-information for services. Services contributed by client 14*a*-14*c* can be tagged using a set of (system-specific) community terms, and browsing and matchmaking functions may be applied using these tags.

System 10 supports service exchange unit 28*a* and 28*b* creation at any time, termination of existing service exchange unit, and service exchange unit membership management. Membership and value-add services are applied to each service exchange unit 28*a* and 28*b* (services group) basis. In summary, system 10 provides a runtime structuring mechanism that supports horizontal, vertical (domain-specific), per-project grouping of services; private, trusted services offerings, using a membership-based access control and trust model; and social networks and interaction practices in services composition, leveraging a spectrum of formal and less formal services description, matchmaking, and composition techniques.

Consider again the healthcare scenario described above. At least three different service exchange unit 28a and 28b, each one featuring different objectives, different clients 14a-14c, and different services can be identified.

A first example is a service exchange unit 28a and 28b created by the pharmaceutical company to group the clients 14a-14c (universities, CMRs, hospitals, etc.) offering preclinical services. The membership-based aspect guarantees that only trusted parties will publish the types of experiments they can execute and also that customized information (such as community-specific offers) is visible only to members of the service exchange unit 28a and 28b. In addition, recognized experts can provide matchmaking services to compare the services offered by group clients 14a-14c and/or third parties.

As a second example, consider per-project service exchange unit 28a and 28b created by the R&D department in order to manage information and tasks associated to specific trials. Each service exchange unit 28a and 28b can group the (legal and financial) services that the pharmaceutical company will make available to the other parties. The clients 14a-14c producing the drug can publish a service to order new quantities of drugs and to distribute information about the process used to create it.

Finally, the clients 14a-14c, which are members of a given service exchange unit 28a and 28b, executing the trial can share, as services, the possibility to access the data sources containing the information generated during the experiments. As an example of a service exchange unit 28a and 28b membership requirement, all clients 14a-14c may have to provide a service implementing a service exchange unit 28a and 28b specific interface to accept generic inquiries coming from other clients. Using these per-project (per-trial) service exchange unit 28a and 28b, the pharmaceutical company is able to monitor all the internal and external communications about a trial (which today are mainly distributed in emails) as well as reduce the time taken to gather the data coming from the experiments.

A third example of a service exchange unit 28a and 28b can be envisioned to group services used by researchers to analyze the data coming from the experiments and to improve decision-making for possible protocol modifications. The services contributed by clients 14a-14c in this service exchange unit 28a and 28b can span from services to access to experimental data, services executing specific complex algorithms, analytic services, and services to access computational power as well as data storage to store complex data.

In one embodiment, the system 10 provides a service exchange unit 28a and 28b creation section. This is the only public endpoint of system 10 and it permits clients 14a-14c of the larger community to create new service exchange unit 28a and 28b by providing a name, membership criteria, and a set of initial tags for the service exchange unit, for instance. As a result, a new service exchange unit 28a and 28b specific platform is spawned. In another embodiment, the service exchange unit 28a and 28b administration is available only to the creator and administrators of the service exchange unit, and this creation section can be used to terminate the service exchange unit, or to supply additional applicable tags for the service exchange unit or the like.

Clients 14a-14c who are members of a given service exchange unit 28a and 28b can create new, or become members of existing service exchange unit 28a and 28b. As service exchange unit 28a and 28b members, clients 14a-14c may contribute services to the service exchange unit.

The system 10 provides a service exchange unit 28a and 28b information section. This is the only public endpoint of the service exchange unit 28a and 28b, providing general information about the service exchange unit to the larger community, for example. Such information may include a summary of the services available, membership criteria, and the social tags that describe the service exchange unit or the like. In one embodiment, clients 14a-14c can apply for membership via this information section and may be approved or denied based on the membership criteria.

Clients 14a-14c, which are members of a given service exchange unit 28a and 28b, can contribute, consume, tag, and compose services. In addition to application services, value-add services such as service exchange unit 28a and 28b analytics and interface, tag-based services matchmaking can also be contributed by clients 14a-14c (including administrators) and later be consumed by other clients.

Further, as different kinds of services are contributed to a service exchange unit 28a and 28b, different rules to their composition exist. For instance one client 14a-14c may contribute an application service to a service exchange unit 28a and 28b while another client may contribute a value-add service to the same service exchange unit. The most important distinction between these two types of services is that value-add services are applied to or injected into the use of application services. Value-add services provide extra functionality such as monitoring, billing, security, reliability, matchmaking, and analytics. Thus, the usage of a contributed application service may be intercepted by one or more selected value-add services.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A service computing system comprising:

a server including a processor;

a plurality of clients in communication with said server, each client including a processor; and a plurality of service exchange units in communication with said server, some of the plurality of service exchange units providing different functional application services contributed by some of the plurality of clients to a portion of said plurality of clients based upon permissions and data received from the portion of said plurality of clients and the different functional application services intercept the invocation of other contributed services;

wherein each of said plurality of service exchange units uses tags defined by the portion of said plurality of clients; and wherein each of said plurality of service exchange units matchmakes between said plurality of clients based upon the tags.

2. The service computing system of claim 1 wherein each of said plurality of service exchange units maintains availability of each service in confidence.

3. The service computing system of claim 1 wherein each of said plurality of service exchange units has the permissions defined by at least one of the portion of said plurality of clients.

4. The service computing system of claim 1 wherein each of said plurality of service exchange units is created by at least one of the portion of said plurality of clients.

5. The service computing system of claim 1 wherein at least one of the services provided by said plurality of service exchange units performs upon being invoked.

6. The service computing system of claim 1 wherein each of said plurality of service exchange units communicates with the portion of said plurality of clients using an application programming interface.

7. The service computing system of claim 1 wherein each of said plurality of service exchange units provides administrative control over at least one of the service, access to the service, use of the service, and billing related to the service.

8. The service computing system of claim 1 wherein at least one of said plurality of clients hosts at least one of said plurality of service exchange units.

9. A method of services computing comprising:

providing by a computer processor a server including a processor in communication with a plurality of clients and a plurality of service exchange units, each client including a processor; and providing different functional application services contributed by some of the plurality of clients via some of the plurality of service exchange units to a portion of the plurality of clients based upon permissions and data received from the portion of the plurality of clients and the different functional application services intercept the invocation of other contributed services;

wherein each of said plurality of service exchange units uses tags defined by the portion of said plurality of clients; and wherein each of said plurality of service exchange units matchmakes between said plurality of clients based upon the tags.

10. The method of claim 9 further comprising maintaining availability of each service in confidence.

11. The method of claim 9 further comprising defining the permissions by at least one of the portion of the plurality of clients.

12. The method of claim 9 further comprising creating each of the plurality of service exchange units by at least one of the portion of the plurality of clients.

13. The method of claim 9 further comprising performing at least one of the services provided by the plurality of service exchange units upon being invoked.

14. The method of claim 9 further comprising structuring each of the plurality of service exchange units to communicate with the portion of the plurality of clients using an application programming interface.

15. A computer program product embodied in a tangible media, the computer program product comprising a non-transitory computer-readable medium embodying computer program code, comprising:

computer readable program codes coupled to the tangible media for services computing, the computer readable program codes configured to cause the program to:

provide a server including a processor in communication with a plurality of clients and a plurality of service exchange units, each client including a processor; and provide different functional application services contributed by some of the plurality of clients via some of the plurality of service exchange units to a portion of the plurality of clients based upon permissions and data received from the portion of the plurality of clients and the different functional application services intercept the invocation of other contributed services;

wherein each of said plurality of service exchange units uses tags defined by the portion of said plurality of clients; and wherein each of said plurality of service exchange units matchmakes between said plurality of clients based upon the tags.

16. The computer program product of claim 15 further comprising program code configured to: maintain availability of each service in confidence.

17. The computer program product of claim 15 further comprising program code configured to: define the permissions by at least one of the portion of the plurality of clients.

18. The computer program product of claim 15 further comprising program code configured to: create each of the plurality of service exchange units by at least one of the portion of the plurality of clients.

* * * * *